United States Patent [19]

Antonellis et al.

[11] Patent Number: 4,526,508
[45] Date of Patent: Jul. 2, 1985

[54] ROTOR ASSEMBLY FOR A GAS TURBINE ENGINE

[75] Inventors: Stephen M. Antonellis, Hebron; Roger D. Breunig, Meriden, both of Conn.

[73] Assignee: United Technologies Corporation, Hartford, Conn.

[21] Appl. No.: 427,109

[22] Filed: Sep. 29, 1982

[51] Int. Cl.$^3$ .............................................. F01D 11/08
[52] U.S. Cl. ............................ 415/172 A; 416/198 A
[58] Field of Search .................... 416/174, 198 A; 415/116, 172 A, 173 R, 173 A, 174

[56] References Cited

U.S. PATENT DOCUMENTS

| 3,034,298 | 5/1962 | White | 415/116 UX |
| 3,245,657 | 4/1966 | Cooper, Jr. et al. | 415/173 B |
| 3,295,825 | 1/1967 | Hall, Jr. | 415/172 A UX |
| 3,343,806 | 9/1967 | Bobo et al. | 415/115 |
| 3,514,112 | 5/1970 | Pettengill, Jr. | 415/172 A X |
| 3,733,146 | 5/1973 | Smith et al. | 415/172 A |
| 3,826,084 | 7/1974 | Branstrom et al. | 415/115 X |
| 4,088,422 | 5/1978 | Martin | 415/173 R X |
| 4,213,738 | 7/1980 | Williams | 416/95 |

Primary Examiner—Charles E. Phillips
Assistant Examiner—Joseph M. Pitko
Attorney, Agent, or Firm—Gene D. Fleischhauer

[57] ABSTRACT

A rotor assembly 20 for a gas turbine engine 10 is disclosed. The rotor assembly includes a pair of axially spaced apart rotor disks such as the rotor disks 32 and 34. An inner air seal 50 extends axially between the adjacent rotor disks. A member 56 extends axially between the disks to join the disks together and is attached to the inner air seal at a mid span location to restrain the seal against outward movement.

13 Claims, 3 Drawing Figures

ROTOR ASSEMBLY FOR A GAS TURBINE ENGINE

TECHNICAL FIELD

This invention relates to gas turbine engines and, more particularly, to a rotor assembly having a sealing structure for working medium gases in such an engine. Although the invention was conceived during work in the field of axial flow, gas turbine engines the invention has application to other fields in which rotary machines are employed.

BACKGROUND ART

An axial flow, gas turbine engine has a compression section, a combustion section and a turbine section. An annular flow path for working medium gases extends axially through these sections. As the working medium gases are flowed along the flow path, the gases are pressurized in the compression sections and burned with fuel in the combustion section to add energy to the gases. The hot, high pressure gases are expanded through the turbine section to produce useful work. The work is used, for example, to power an aircraft with thrust, or to power a free turbine with pressurized gases and to pressurize the gases in the compression section.

A rotor assembly extends axially through the engine to transfer the work of pressurization from the turbine section to the compression section. In the turbine section, the rotor assembly includes rotor disks each having arrays of rotor blades which extend outwardly across the working medium flow path. The arrays of rotor blades are angled with respect to the approaching flow to receive work from the gases and to drive the disks about the axis of rotation.

A stator assembly circumscribes the rotor assembly. The stator assembly has an outer case which contains the working medium gases and arrays of stator vanes which are attached to the outer case. Each array of vanes extends inwardly across the working medium flow path upstream of an associated array of rotor blades. The stator vanes direct the working medium gases into the arrays of rotor blades at angles which optimize the performance of the engine. Accordingly, it is important that the working medium gases flow through the stator vanes and not around the tips of the stator vanes to preserve the efficiency of the engine.

However, the stator vanes are spaced radially from the rotor assembly by a clearance gap during normal operation to avoid contact between the blades and the vanes which might destroy either the moving blades or the stationary vanes. A labyrinth seal is provided to block the gases from flowing through this clearance and around the vanes. The labyrinth seal is formed of a seal land on the stator vanes and knife edge elements on the rotor assembly. Examples of such constructions are shown in U.S. Pat. No. 3,826,084 entitled "Turbine Cooling Flow System" issued to Branstorm et al. and U.S. Pat. No. 4,213,738 entitled "Cooling Air Control Valve" issued to Williams. In these constructions, an inner air seal carrying the knife edges extends between adjacent rotor disks.

The maximum size of the gap is set by the transient growth which occurs during an increase in an engine power from low power to high power. As the engine is accelerated from a low power such as idle power to a high power such as sea level takeoff power, the temperature of the working medium gases increases dramatically. The stator vanes are in intimate contact with the hot working medium gases and are rapidly heated as a result of the increased temperature of the gases. The outer case which is more remotely located from the working medium flow path responds more slowly to the gases than do the vanes. The vanes expand inwardly toward the rotor assembly decreasing the clearance between the seal land on the vanes and the knife edges on the inner air seal of the rotor assembly.

Movement of the inner air seal outwardly toward the stator vanes during acceleration of the engine increases the size of the gap needed to accommodate transient operation. The amount of thermal growth experienced by the seal is increased by locating the inner air seal in close proximity to the working medium flow path because the seal is rapidly heated by the working medium gases. As a result, the gap between the array of stator vanes and inner air seal must be increased even further to insure that destructive interference between these components does not occur during transient operation of the engine.

One possible way of decreasing the gap by decreasing the outward movement of the air seal is shown in U.S. Pat. No. 3,343,806 issued to Bobo et al. entitled "Rotor Assembly For Gas Turbine Engines." Bobo discloses an inner air seal mounted on a rotor disk. The rotor disk extends radially between the blade carrying disks and is described as being relatively massive. The rotor disk acts to radially support the inner air seal to decrease stresses in the seal and to act as a heat sink for conducting heat away from the knife edge elements.

In modern engines, it is also desirable to decrease the mass of the inner air seal to minimize the adverse impact that the mass of the seal has on engine performance. Accordingly, scientists and engineers are working to develop an inner air seal extending between rotor disks which is positively restrained against thermal expansion and which does not have a relatively large mass in comparison with inner air seals which are not similarly restrained.

DISCLOSURE OF INVENTION

According to the present invention, a seal extending between adjacent disks of a rotor assembly is radially restrained at a mid span location along the seal by a structure inwardly of the seal which joins the disks together.

In accordance with one embodiment of the present invention, a means for attaching the seal to the structure allows the seal to move outwardly before restraining the seal against further outward movement.

A primary feature of the present invention is a pair of disks spaced axially one from the other. Another feature is a structure extending axially between the disks which is integrally attached to the disks. A feature is a seal spaced outwardly from the structure joining the disks. The seal is attached at a mid span location to the structure joining the disks. In one embodiment, the seal is trapped radially by flanges on the disks. The seal is trapped axially between the disks and spaced axially by a distance A' from joining the disks to permit relative axial growth between the disks and the seal. In one embodiment, a first hook is attached to the structure joining the disks. The seal has at least one knife edge element which extends circumferentially about the seal. The knife edge extends outwardly. A circumferentially extending second hook extends radially inwardly from the seal. The second hook is attached to the seal adjacent to the knife edge. The first hook engages the hook on the seal. In one embodiment, the second hook in a first position is spaced radially from the first hook by a distance G and is movable outwardly to a second position to engage the first hook.

A primary advantage of the present invention is the engine efficiency which results from restraining the seal against radially outward movement in response to heating of the seal. Another advantage is the engine efficiency associated with the weight of the rotor assembly which results from using an existing structure joining the disks to restrain the seal at a mid span location. An advantage of the present invention is the thermal stability of the structure joining the disks which results from shielding the structure with the inner air seal. Still another advantage of the present invention is the fatigue life of the rotor assembly which results from damping vibrations transmitted from the disks to the inner air seal and to the structure joining the disks. In one embodiment, an advantage is the fatigue life associated with the stiffness of the rotor assembly which results from the rotor disks at the rim sections. In one embodiment the fatigue life of the rotor assembly is increased by spacing the hooks apart to permit a small amount of relative radial gowth between the inner seal and the structure joining the disks.

The foregoing features and advantages of the present invention will become more apparent in the light of the following detailed description of the best mode for carrying out-the invention and in the accompanying drawing.

BEST MODE FOR CARRYING OUT INVENTION

Figure 1:
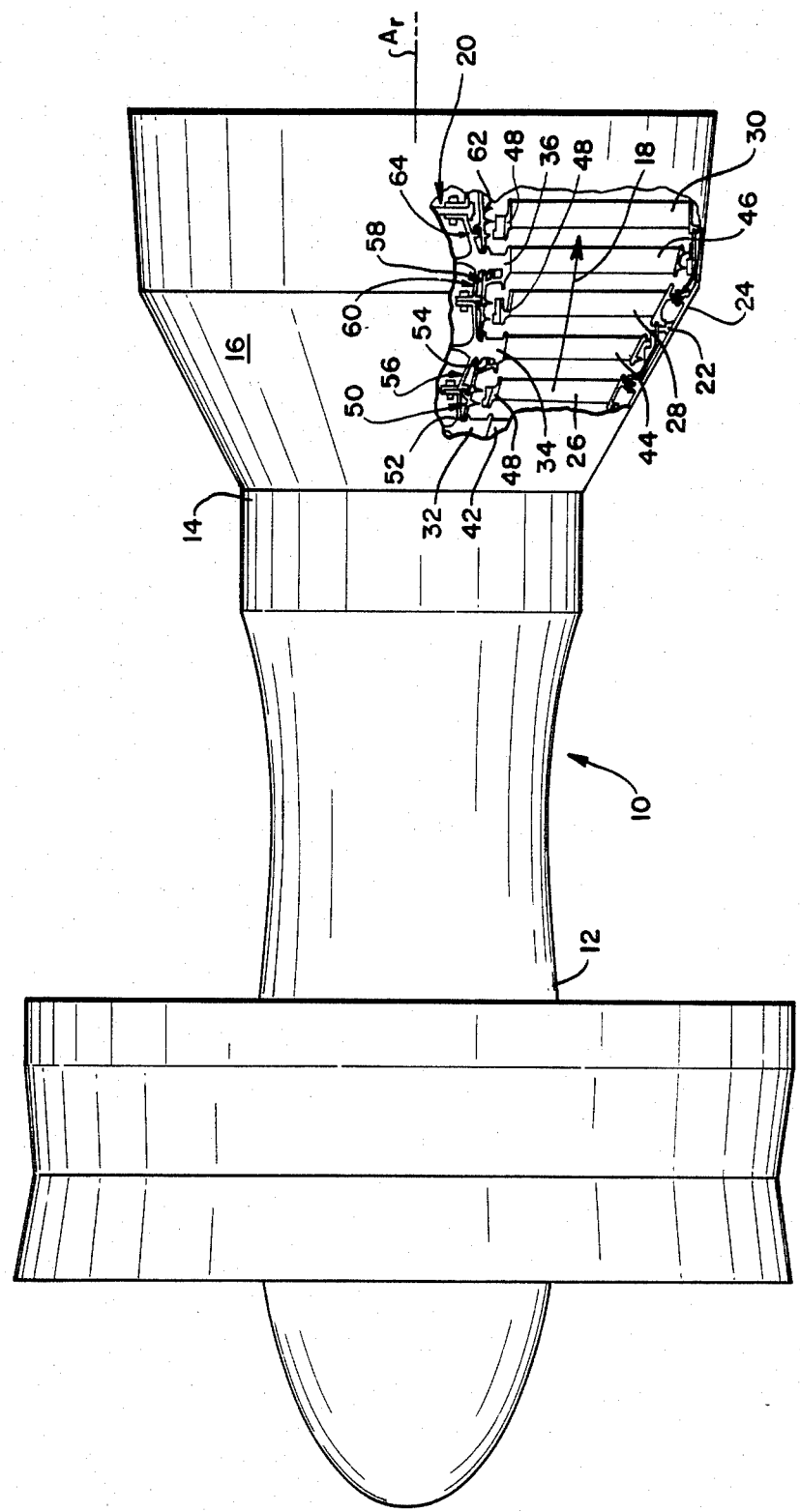
FIG. 1 is a side elevation view of an axial flow gas turbine engine with a portion of the engine broken away to show the turbine section of the engine.

A gas turbine engine 10 of the axial flow, turbofan type is shown in FIG. 1. The engine includes a compression section 12, a combustion section 14 and a turbine section 16. An annular flow path 18 for working medium gases extends axially through the sections of the engine. The engine has a rotor assembly 20 having an axis of rotation $A_r$. The rotor assembly extends axially through the engine along the working medium flow path. A stator assembly 22 circumscribes the rotor assembly.

The stator assembly 22 has an outer case 24 which circumscribes the working medium flow path 18. Arrays of stator vanes as represented by the single stator vane 26, the single stator vane 28 and the single stator vane 30 are attached to the outer case. Each stator vane extends inwardly across the working medium flow path into proximity with the rotor assembly 20.

The rotor assembly 20 includes a first rotor disk 32, a second rotor disk 34 and a third rotor disk 36. The rotor disks are axially spaced one from the other. Each rotor disk extends circumferentially about the axis of rotation $A_r$. Each rotor disk carries an array of rotor blades such as the rotor blade 42 at the first disk, the rotor blade 44 at the second disk, and the rotor blade 46 at the third disk.

The stator vane 26 extends inwardly from the outer case between the rotor blade 42 and the rotor blade 44. The stator vane has an inner end 48. An inner air seal 50 is spaced inwardly from the end of the vanes leaving a clearance gap C therebetween. The seal is trapped axially between the rotor disk 32 and the rotor disk 34 and extends circumferentially about the axis of rotation $A_r$. The seal has an upstream end 52 and a downstream end 54. Means inwardly of the seal for joining the disks 32, 34 and for restraining the seal, such as the member 56, is attached to the disks and to the seal. The member 56 is attached to the seal at a mid-span location. The term "mid span location" means a location in the midst of the axial span such as a central part or a point on the interior of the span which is spaced axially from both ends of the seal. In a like manner, an inner air seal 58 is trapped axially between the rotor disk 34 and the disk 36. A means 60 inwardly of the seal for joining the disks 34, 36 and for restraining the seal 58 at a mid span location is attached to the disks and to the seal 54. Similarly, an inner air seal 62 is trapped axially between the disk 36 and a downstream disk (not shown). A means 64 inwardly of the seal for joining the disk and restraining the seal at a mid span location is attached to the disk 36, to the downstream disk and to the seal at a midspan location.

Figure 2:
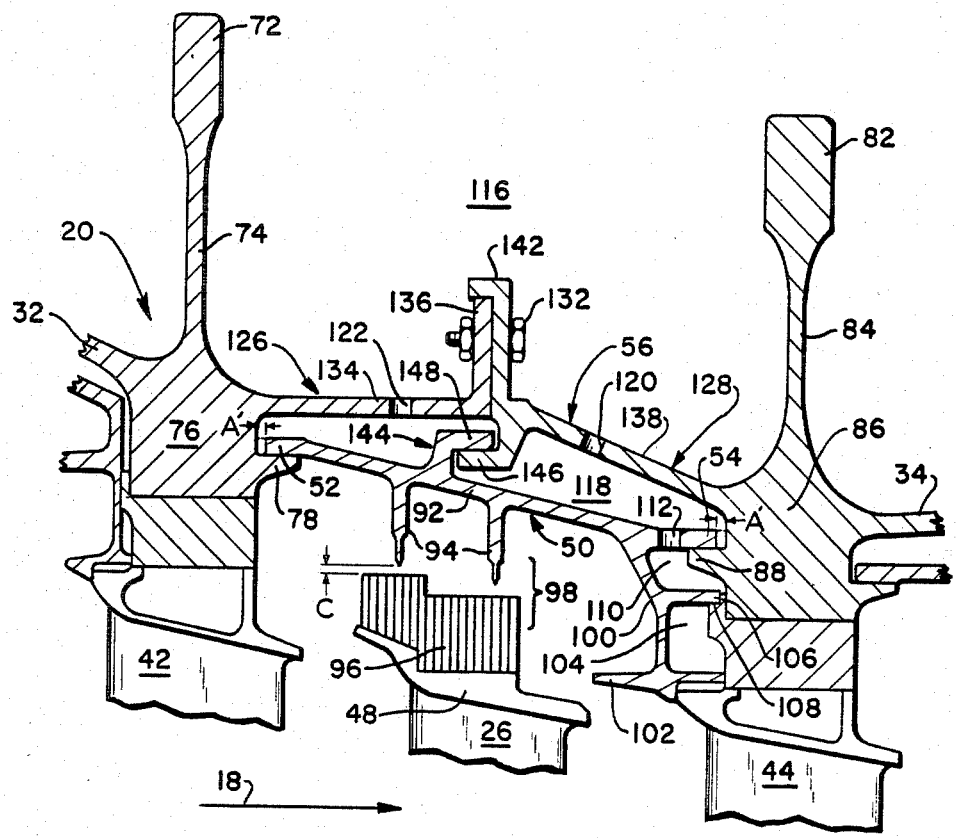
FIG. 2 is a cross-sectional view of a portion of the rotor assembly shown in FIG. 1.

FIG. 2 is an enlarged cross-sectional view of a portion of the rotor assembly 20 and the stator asembly 22 shown in FIG. 1. The first rotor disk 32 includes a bore section 72, a web section 74 and a rim section 76. Each section extends circumferentially about an axis of symmetry $A_s$. The web section connects the bore section to the rim section. The rim section has a continuous flange 78. The flange extends circumferentially about the disk. The second rotor disk 34 has a bore section 82, a web section 84 and a rim section 86. Each section extends circumferentially about the axis of symmetry $A_s$. The web section connects the bore section to the rim section. The rim section includes a continuous flange 88. The flange extends circumferentially about the disk and axially toward the flange 78 on the first disk. The inner air seal 50 extends axially to engage the flange 78 on the first disk and the flange 88 on the second disk. The seal includes a region 92 having one or more knife edge members 94. The knife edge members extend outwardly and circumferentially about the seal into proximity with the ends 48 of the vanes 26 leaving the clearance gap C therebetween. A circumferentially extending seal land 96 formed of a honeycomb material is attached to the inner end of the stator vane. The knife edge elements and the seal land are radially and axially oriented to form a labyrinth seal 98.

A web 100 extends radially outwardly from the inner air seal. A cylindrical flow guide 102 is attached to the web. The flow guide is spaced radially from the inner air seal leaving a chamber 104 therebetween. The flow guide engages the rotor blades 44 to provide axial retention of the rotor blades and extends upstream to aid the inner air seal in confining the working medium gases to the annular flow path 18. A second cylindrical member 106 extending from the web is splined to the rotar blades at a spline-type connection 108 to provide an antirotation feature to the web and to the inner air seal. The web, the second cylindrical member and the inner air seal form a cooling air manifold 110. The inner air seal has a hole 112 for cooling air in fluid communication with the manifold.

The disks 32 and 34 and the member 56 for joining the disks form a first cavity 116 inwardly of the member 56. The member is spaced radially inwardly from the inner air seal to form a second cavity 118 therebetween outwardly of the first cavity. The member has holes 120 and 122 which place the first cavity in fluid communication with the second cavity. The second cavity is in fluid communication through hole 112 with the cooling air manifold 110 and thence through the coolable rotor blades with the working medium flow path 18. The member 56 for joining the disks 32 and 34 includes a first wing 126 and a second wing 128 integrally attached together by nut and bolt combinations 132. The first wing has a first portion 134 which extends in a generally axially direction and a second portion, such as the circumferentially extending flange 136, which extends in a generally radial direction. The first wing extends circumferentially about the rim section 76 of the first disk and is integrally attached to the disk inwardly of the flange 78. The term "integrally attached" and "integrally joined" means the parts so joined or attached are rigidly secured together, such as by forming the parts in one piece or by welding, bonding or mechanically fastening the parts together. The second wing 128 extends circumferentially about the rim section 86 of the second disk 34 and is integrally attached to the second disk. The second wing has a first portion 138 which extends in a generally axial direction and a second portion which extends in a generally radial direction, such as the flange 142.

A means 144 for attaching the inner air seal to the member 56 extends across the second cavity 118 to engage both the member 56 and the inner air seal. In the embodiment shown, the means 144 for attaching the inner air seal to the member 56 includes a first hook 146 which is integrally attached to the second wing 128. The first hook extends circumferentially about the wing. The first hook extends outwardly from the wing and axially with respect to the wing. The means for attaching the inner air seal to the member 56 includes a second hook 148 which is integrally attached to the inner air seal inwardly of and radially adjacent to the region 92 carrying the circumferentially extending knife edge seal elements 94. The second hook extends circumferentially about the inner air seal. The second hook extends inwardly from the inner air seal and axially with respect to the inner air seal to slidably engage the first hook in the axial direction.

Figure 3:
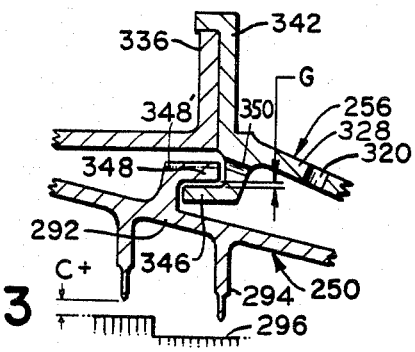
FIG. 3 is an enlarged view which shows an alternate embodiment of a portion of the rotor assembly shown in FIG. 2.

FIG. 3 is an enlarged view of a portion of the rotor assembly shown in FIG. 2 illustrating an alternate embodiment in which the second hook 348 in a first position extends radially inwardly beyond the first hook 346 leaving a gap G therebetween. The second hook is radially movable to a second (moved) position in response to operative forces and temperatures. The moved position is shown by the broken line 348′. The second hook engages the first hook in the moved position. The second wing 328 has a hole 320 therethrough to place the first cavity in fluid communication with the second cavity. The first hook is provided with at least one hole 350 to allow cooling air to circulate from a portion of the second cavity radially outwardly of the second wing to a portion of the second cavity radially outwardly of the first wing.

During operation of the gas turbine engine, working medium gases are compressed in the compression section 12 and burned with fuel in the combustion section 14 to form hot, high pressure working medium gases. These hot gases are expanded through the turbine section 16 to produce useful power. As the gases are flowed through the turbine section, the gases move along the working medium flow path 18 through the array of rotor blades 42 and the array of stator vanes 26. The labyrinth seal 98 formed by the knife edge elements 94 and the seal land 96 on the stator vanes blocks the gases from flowing inwardly around the end of the stator vanes forcing the gases to follow the flow path and preserving engine efficiency.

An increase in engine powwer causes an increase in the temperature of the gases passing through the turbine section 16. Components in intimate contact with the gases are rapidly heated. Examples of these components are the stator vanes 26 and the seal 50 inwardly of the vanes. Components more remote from the working medium flow path, such as the coolable outer case which supports the vanes, are not as rapidly heated. As a result, the vanes 26 expand inwardly from the outer case toward the knife edge elements 94 which are attached to the seal 50. A clearance C is provided to accommodate this transient relative movement and avoid destructive interference between the vane and the knife edge elements on the seal 50. The clearance unavoidably allows a small amount of leakage through the seal.

The inner air seal 50 is restrained by the wings 126 and 128 against thermal expansion outwardly toward the vane to reduce the clearance needed between the vane and the knife edge elements. The restraining force exerted on the seal by the wings is transmitted from the wings to the seal by the hooks 144 and 146. The smaller clearance C reduces leakage around the vanes and improves engine efficiency as compared with constructions having an unrestrained seal and a larger clearance.

The functions of the inner air seal 50, the wings 126 and the wing 128 are interrelated. The seal blocks the hot working medium gases from contacting the wings of the disk which reduces the response of the wings to the hot gases. Because the response of the wings is reduced, the wings provide a relatively stable structure for restraining the mid span region of the seal against thermal growth. In addition, the seal and the wings provide the first cavity 116 and the second cavity 118 for ducting cooling air outwardly through the manifold 110 to the coolable rotor blades. The cavities further increase the isolation of the wings from the hot working medium gases.

The wings 134, 138 extend circumferentially about the axis of rotation and are integrally attached to the disk. The restraining force exerted by the wings causes an equal and opposite force to act on the wings. A bending moment is imposed on the wings. As shown in FIG. 2, the flanges 136 and 142 of the wings have a greater moment of inertia about the axis of symmetry $A_s$ than do the remainder of the wings. The flanges reinforce the wings against the force exerted by the hooks by being located near the hooks. In addition, the flanges are disposed in the cavity 116 and the hooks in cavity 118. As a result both the flanges and the hooks are bathed in cool air, increasing their ability to resist thermal growth and to aid the wings in providing a stable support for the inner air seal 50.

The hooks 144 and 146 which transmit the restraining force from the wings to the seal 50 (and seals 58 and 62 as shown in FIG. 1) are attached radially inward of and adjacent to the region 92 having the knife edge elements 94. Attaching the hooks near the knife edges avoids seal deflections between region 92 and the point of attachment.

The hooks 144 and 146 have another advantage. The hooks provide a low radial profile means of attaching the wings to the inner air seal. The low radial profile permits attaching the wings at the rim sections 76 and 86 of the adjacent disks. Attaching the wings to the rim sections increases the diameter of the cylindrically shaped wings and therefore increases the stiffness of the wings as compared with smaller diameter cylinders. Because the fatigue life of the disk is limited by vibrations in the rim section, the large diameter wings decrease these vibrations with a concomitant increase in fatigue life. As shown in both FIG. 2 and FIG. 3, the hook 144 slidably engages the hook 146. The slidable engagement permits the hooks to frictionally dampen vibrations in the rim section of the disk which are transmitted through the seal 50 and the wings to the hooks.

In the alternate embodiment shown in FIG. 3, a small gap G is provided in the radial direction between the hooks 346 and 348. The clearance G permits the inner air seal 250 to thermally expand outwardly a small controlled distance. The thermal growth reduces the level of stress in the hooks permitting a lighter weight construction in this region with the same fatigue life. A clearance C+ which is greater than the clearance C is provided to permit this expansion without destructive contact between the knife edge 294 and the seal land 296.

Although the invention has been shown and described with respect to detailed embodiments thereof, it should be understood by those skilled in the art that various changes in form and detail thereof may be made without departing from the spirit and the scope of the claimed invention.

We claim:

1. A rotor assembly for an axial flow rotary machine having an axis of rotation extending in an axial direction, the rotor assembly extending outwardly in a radial direction across an annular flow path for working medium gases and having at least two axially spaced rotor disks extending in a circumferential direction about the axis of rotation, which comprises:

a seal extending axially between the disk and circumferentially about the axis of rotation;

first means inwardly of the seal which is adapted to be attached to the disks and attached to the seal at a mid span location of the seal for joining the disks and for restraining the seal at a mid span location against thermal expansion in the radial direction; and, second means for attaching the first means to the seal at a mid span locationl of the seal which extends between the first means and the seal and permits a predetermined amount of relative movement between the seal and the first means in at least one of said directions;

wherein the seal blocks the hot working medium gases from the first means joining the disks to decrease the response of the first means to increases in the temperature of the working medium gases.

2. The rotor assembly of claim 1 wherein the seal further includes a region having at least one knife edge element extending circumferentially about the seal and outwardly from the seal and wherein the second means for attaching said first means to the seal engages the seal radially inwardly of and adjacent to the region having the knife edge element.

3. The rotor assembly of claim 2, wherein the first means which joins the disks and restrains the seal further includes at least one flange extending radially inwardly from the first means.

4. A rotor assembly for a gas turbine engine which comprises:
   A. a first rotor disk which includes
      1. a bore section,
      2. a web section and
      3. a rim section, connected to the bore section by the web section, the rim section including a flange extending circumferentially about the rim section of the disk;
   B. a second rotor disk spaced axially from the first rotor disk leaving a cavity therebetween, the second rotor disk including
      1. a bore section,
      2. a web section,
      3. a rim section connected to the bore section by the web section, the rim section including a flange extending circumferentially about the disk and axially toward the flange on the first disk;
   C. an inner seal extending axially between the first rotor disk and the second rotor disk which engages the flanges on the disks, the seal including a region having at least two knife edge elements which extend outwardly and circumferentially about the seal;
   D. means inwardly of the inner air seal for joining the disks and for restraining the inner air seal at a mid span location which includes
      1. a first wing integrally attached to the first disk inwardly of the flange, the first wing extending circumferentially about the rim section, the first wing having a first portion which extends in a generally axial direction and a second portion which extends in a generally radial direction, and
      2. a second wing integrally attached to the second disk inwardly of the flange, the second wing extending circumferentially about the rim section, the second wing having a first portion which extends in a generally axial direction and a second portion which extends in a generally radial direction and is integrally attached to the second portion of the first disk forming a first cavity inwardly of the wings and being spaced inwardly from the inner air seal leaving a second cavity therebetween; and,
   E. means for attaching the inner air seal to said means for joining the disks and restraining the inner air seal including
      1. a first hook integrally attached to one of said wings which extends circumferentially about the wing, outwardly from the wing and axially with respect to the wing, and
      2. a second hook integrally attached to the inner air seal inwardly of and radially adjacent to the region having the seal elements, the second hook extending circumferentially about the inner air seal and axially with respect to the inner air seal to slidably engage the first hook in the axial direction;

wherein the inner air seal blocks the working medium gases from contacting the wings to reduce stress concentration in the wings and to provide a support which is relatively insensitive to changes in the temperatures of the hot working medium gases as compared with the inner air seal, and wherein the wing is attached to the inner air seal to limit movement of the inner air seal outwardly with respect to the wings.

5. The rotor assembly of claim 4 wherein the second hook in a first position extends radially inwardly with respect to the first hook beyond the first hook leaving a gap G therebetween and wherein the second hook is movable radially with respect to the first hook in response to operative forces and temperatures to a second position and in the second position engages the first hook.

6. The rotor assembly as claimed in claim 4 or 5 wherein said first hook on the wing is adjacent to the second portion of the wing.

7. The rotor assembly as claimed in claim 4 or 5 wherein the first cavity is in flow communication with a source of cooling air and wherein at least one wing has at least one hole extending through the wing to place a portion of the second cavity in fluid communication with the first cavity.

8. The invention as claimed in claim 7 wherein each wing has at least one hole therethrough which places the entire second cavity in flow communication with the first cavity.

9. The invention as claimed in claim 4 or 5 wherein at least one wing has a hole therethrough and wherein at least one of said hooks has a hole therethrough to place the entire second cavity in flow communication with the first cavity.

10. A rotor assembly for an axial flow rotary machine having an axis of rotation, the rotor assembly extending outwardly across an annular flow path for working medium gases and having at least two axially spaced rotor disks each of which has a rim section, which comprises:
   a seal which engages the rim section of each disk and which extends axially between the disks and circumferentially about the axis of rotation;
   first means inwardly of the seal which is adapted to be attached to the disks and attached to the seal at a mid span location of the seal for joining the disks and for restraining the seal at a mid span location against thermal expansion, which engages the rim section of each disk at a point inwardly of the seal to form a first cavity inwardly of the first means, and which is spaced inwardly from the seal leaving a second cavity therebetween; and,
   second means disposed in the second cavity for attaching the first means to the seal at a mid span location of the seal; wherein the seal blocks the hot working medium gases from said first means decreasing the response of said first means to increases in the temperature of the working medium gases.

11. The rotor assembly of claim 10 wherein the first means which joins the disks and restrains the seal further includes at least one flange extending radially inwardly from the first means which is disposed in said first cavity.

12. A rotor assembly for an axial flow rotary machine having an axis of rotation, the rotor assembly extending outwardly across an annular flow path for working medium gases and having at least two axially spaced rotor disks each of which has a rim section, which comprises:
   a seal which engages the rim section of each disk and which extends axially between the disks and circumferentially about the axis of rotation;
   first means inwardly of the seal which is adapted to be attached to the disks and attached to the seal at a mid span location of the seal for joining the disks and for restraining the seal at a mid span location against thermal expansion, which engages the rim section of each disk at a point inwardly of the seal to form a first cavity inwardly of the first means, which is spaced inwardly from the seal leaving a second cavity therebetween, and which has at least one flange which extends radially inwardly from the first means that is disposed in said first cavity; and,
   second means disposed in the second cavity for attaching the first means to the seal at a mid span location of the seal which includes a first hook integrally attached to the first means, the first hook extending radially outwardly from and axially with respect to the first means, and which includes a second hook integrally attached to the seal, the second hook extending axially and radially with respect to the first hook to engage the first hook wherein the seal blocks the hot working medium gases from said first means decreasing the response of said first means to increases in the temperature of the working medium gases.

13. The rotor assembly as claimed in claim 12 wherein the second hook relative to the first hook in a first position is spaced radially from the first hook by a gap G and wherein the second hook is radially movable in response to operative temperatures and forces to a second position in which said second hook slidably engages said first hook in the axial direction.

* * * * *